United States Patent
Rai et al.

(10) Patent No.: US 12,105,548 B2
(45) Date of Patent: Oct. 1, 2024

(54) IMPROVING POWER SUPPLY REJECTION RATIO ACROSS LOAD AND SUPPLY VARIANCES

(71) Applicant: Texas Instruments Incorporated, Dallas, TX (US)

(72) Inventors: Saurabh Rai, Bangalore (IN); Ramakrishna Ankamreddi, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 244 days.

(21) Appl. No.: 17/732,755

(22) Filed: Apr. 29, 2022

(65) Prior Publication Data

US 2023/0006536 A1 Jan. 5, 2023

(30) Foreign Application Priority Data

Jun. 10, 2021 (IN) .............................. 202141025763

(51) Int. Cl.
| | | |
|---|---|---|
| G05F 1/575 | (2006.01) | |
| G05F 3/26 | (2006.01) | |
| H02M 1/00 | (2006.01) | |
| H02M 1/14 | (2006.01) | |
| H02M 3/156 | (2006.01) | |

(52) U.S. Cl.
CPC ................ *G05F 1/575* (2013.01); *G05F 3/26* (2013.01); *H02M 1/0045* (2021.05); *H02M 1/143* (2013.01); *H02M 3/156* (2013.01)

(58) Field of Classification Search
CPC ........ G05F 1/575; G05F 3/26; H02M 1/0045; H02M 1/143; H02M 3/156
See application file for complete search history.

(56) References Cited

U.S. PATENT DOCUMENTS

| | | | | |
|---|---|---|---|---|
| 5,867,015 A | * | 2/1999 | Corsi ...................... | G05F 3/242 |
| | | | | 327/542 |
| 6,465,994 B1 | * | 10/2002 | Xi .......................... | G05F 1/575 |
| | | | | 323/280 |
| 6,914,476 B2 | | 7/2005 | Ingino, Jr. | |
| (Continued) | | | | |

OTHER PUBLICATIONS

PCT International Search Report, PCT/US2022/032996, mail date: Sep. 28, 2022, 4 pages.

*Primary Examiner* — Yusef A Ahmed
(74) *Attorney, Agent, or Firm* — Ray A. King; Frank D. Cimino

(57) ABSTRACT

Described embodiments include a circuit for reducing output voltage noise in a voltage regulator includes an amplifier having first and second amplifier inputs, a compensation terminal and an amplifier output. The first amplifier input is coupled to a reference voltage terminal, and the compensation terminal coupled to an output terminal. A buffer amplifier has a buffer input and a buffer output, and the buffer input is coupled to the amplifier output. A first transistor is coupled between a supply voltage terminal and the output terminal, and has a first control terminal that is coupled to the buffer output. A boost current injection circuit has a boost input and a boost output, and the boost input is coupled to the supply voltage terminal. A second transistor is coupled between the boost output and the compensation terminal, and has a second control terminal.

20 Claims, 3 Drawing Sheets

(56) References Cited

U.S. PATENT DOCUMENTS

| | | | |
|---|---|---|---|
| 7,622,902 B1 * | 11/2009 | Kao | G05F 1/575 323/280 |
| 7,852,054 B2 * | 12/2010 | Kao | G05F 1/573 323/279 |
| 8,143,868 B2 | 3/2012 | Dasgupta et al. | |
| 8,816,658 B1 * | 8/2014 | De Vita | G05F 1/575 323/275 |
| 9,214,866 B2 | 12/2015 | Nora | |
| 9,274,534 B2 * | 3/2016 | Fang | G05F 1/575 |
| 9,671,801 B2 | 6/2017 | Bhattad et al. | |
| 9,778,672 B1 * | 10/2017 | Gao | G05F 1/575 |
| 10,411,599 B1 | 9/2019 | Shi et al. | |
| 10,498,333 B1 * | 12/2019 | Ankamreddi | G05F 1/565 |
| 10,768,650 B1 * | 9/2020 | Huang | G05F 1/575 |
| 11,029,716 B1 | 6/2021 | Chan | H02M 3/073 |
| 11,036,247 B1 * | 6/2021 | Wei | G05F 1/575 |
| 11,316,420 B2 * | 4/2022 | Phogat | H03F 3/45183 |
| 11,782,468 B2 * | 10/2023 | Joshi | G05F 1/575 323/273 |
| 2003/0147193 A1 * | 8/2003 | Hamon | G05F 1/573 323/280 |
| 2004/0021450 A1 * | 2/2004 | Wrathall | H02M 3/156 323/282 |
| 2004/0095105 A1 * | 5/2004 | Nakata | G05F 1/56 323/280 |
| 2005/0088153 A1 * | 4/2005 | Suzuki | G05F 1/575 323/274 |
| 2007/0241730 A1 * | 10/2007 | Dow | G05F 1/575 323/280 |
| 2008/0180074 A1 * | 7/2008 | Einerman | G05F 1/575 323/280 |
| 2008/0284394 A1 * | 11/2008 | Yin | G05F 1/575 327/537 |
| 2009/0086517 A1 * | 4/2009 | Wei | H02M 3/156 363/50 |
| 2009/0128112 A1 * | 5/2009 | Xu | H02M 1/32 323/282 |
| 2011/0018510 A1 * | 1/2011 | Gao | G05F 1/575 323/280 |
| 2012/0038332 A1 * | 2/2012 | Lin | G05F 1/575 323/277 |
| 2012/0212199 A1 * | 8/2012 | Amer | G05F 1/575 323/280 |
| 2012/0212200 A1 * | 8/2012 | Amer | G05F 1/575 323/282 |
| 2015/0097541 A1 * | 4/2015 | Banag | G05F 1/575 323/281 |
| 2016/0126238 A1 | 5/2016 | Tajima et al. | |
| 2017/0025952 A1 * | 1/2017 | Huang | H02M 3/158 |
| 2017/0090494 A1 * | 3/2017 | Cui | G05F 1/562 |
| 2017/0308108 A1 * | 10/2017 | Pigott | G05F 1/571 |
| 2018/0292853 A1 * | 10/2018 | Jefremow | G05F 1/565 |
| 2019/0089246 A1 * | 3/2019 | Santhosh | H02M 3/33507 |
| 2020/0336141 A1 * | 10/2020 | S | H03K 17/302 |
| 2021/0311513 A1 * | 10/2021 | Joshi | G05F 1/575 |
| 2021/0318703 A1 * | 10/2021 | Jin | G05F 1/575 |
| 2022/0187863 A1 * | 6/2022 | Ankamreddi | G05F 1/565 |
| 2022/0397927 A1 * | 12/2022 | Rai | G05F 1/565 |

\* cited by examiner

IMPROVING POWER SUPPLY REJECTION RATIO ACROSS LOAD AND SUPPLY VARIANCES

CROSS-REFERENCE TO RELATED APPLICATION

This application claims priority to Indian Patent Application No. 202141025763 filed Jun. 10, 2021, which is incorporated herein by reference.

BACKGROUND

This description relates to voltage regulators and to improving the power supply rejection ratio (PSRR) in voltage regulators across variations in the load current and the supply voltage. PSRR is a ratio of the magnitude of alternating current (AC) voltage on the output voltage of a regulator to the magnitude of AC voltage on the input voltage of the regulator. PSRR provides a measure of how much of the noise on the input supply signal is present on the output signal.

PSRR can describe the capability of an electronic circuit to suppress the effects on its output signal due to variations in load current or the input power supply signal. In a voltage regulator, PSRR can be a measure of how well a circuit rejects ripple coming from the input power supply at various frequencies, and may be an important specification in many RF and wireless applications.

SUMMARY

In a first example, a circuit for reducing output voltage noise in a voltage regulator includes an amplifier having first and second amplifier inputs, a compensation terminal and an amplifier output. The first amplifier input is coupled to a reference voltage terminal, and the compensation terminal coupled to an output terminal. A buffer amplifier has a buffer input and a buffer output, and the buffer input is coupled to the amplifier output.

A first transistor is coupled between a supply voltage terminal and the output terminal, and has a first control terminal that is coupled to the buffer output. A boost current injection circuit has a boost input and a boost output, and the boost input is coupled to the supply voltage terminal. A second transistor is coupled between the boost output and the compensation terminal, and has a second control terminal.

In a second example, a voltage regulator circuit includes an amplifier having first and second amplifier inputs, a compensation terminal and an amplifier output. The first amplifier input is coupled to a reference voltage terminal, and the compensation terminal is coupled to a first compensation circuit. A buffer amplifier has a buffer input and a buffer output. The buffer input is coupled to the amplifier output.

A first transistor is coupled between a supply voltage terminal and the output terminal. The first transistor has a first control terminal coupled to the buffer output. A second transistor is coupled between the first compensation circuit and the output terminal. The second transistor has a second control terminal coupled to a second compensation circuit.

DETAILED DESCRIPTION

In this description, the same reference numbers depict same or similar (by function and/or structure) features. The drawings are not necessarily drawn to scale.

PSRR is a specification that measures the ability of a voltage regulator circuit to reject ripple from the input power supply at various frequencies and attenuate the ripple on the output signal. Variations in the amount of load current and in the input supply voltage can have adverse effects on the PSRR in a voltage regulator circuit.

Figure 1:
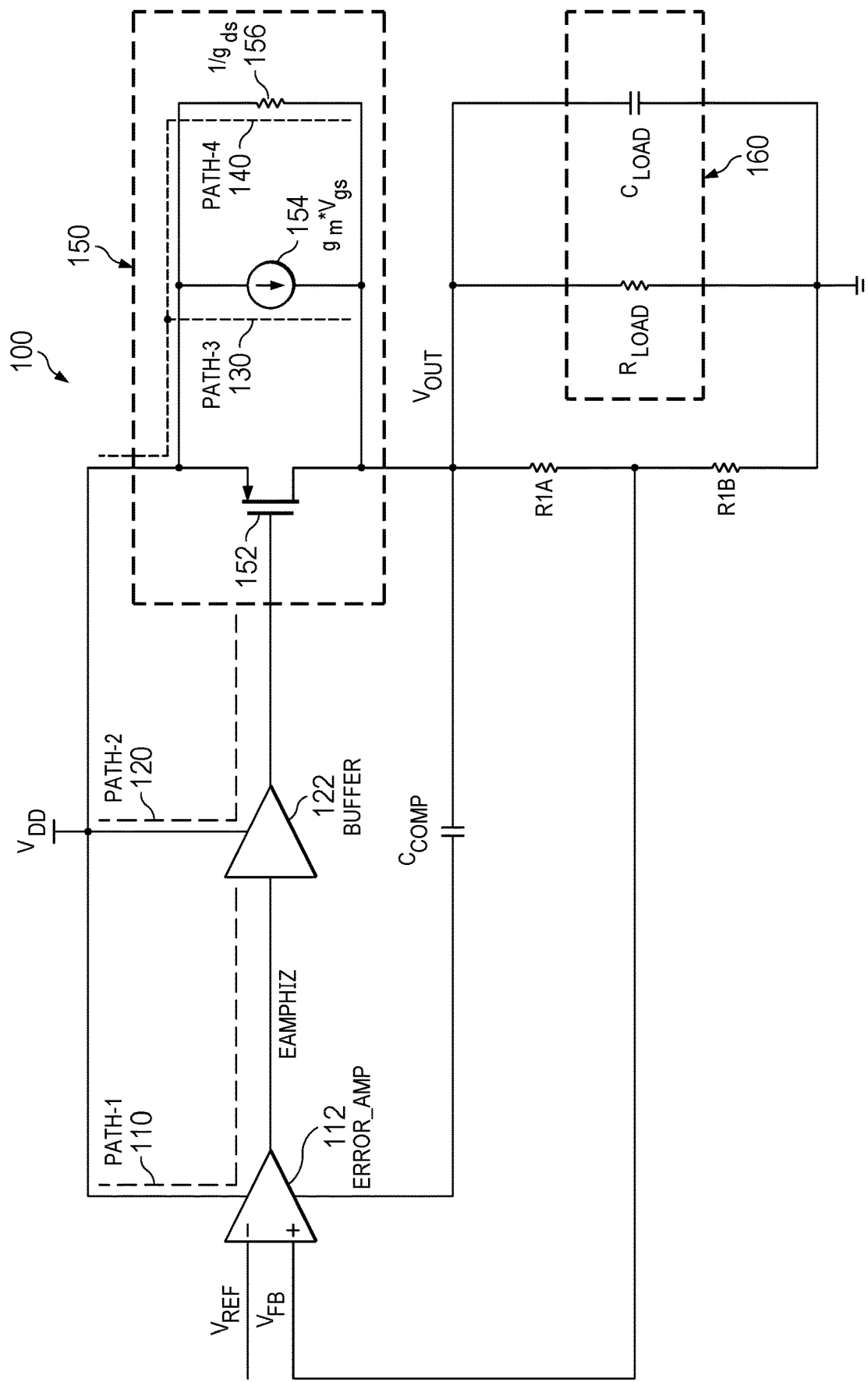
FIG. 1 shows a schematic diagram of an example voltage regulator and four paths where noise that is present on the input power supply signal can be passed through to the output voltage signal.

FIG. 1 shows a schematic diagram of an example voltage regulator 100 and four circuit conduction paths where noise that is present on the input power supply signal can propagate through to the output voltage signal. The input for voltage regulator 100 is $V_{DD}$. The output for voltage regulator 100 is $V_{OUT}$. Resistors R1A and R1B are coupled in series between $V_{OUT}$ and ground, and form a voltage divider for the voltage at $V_{OUT}$ to provide a feedback voltage signal $V_{FB}$ for voltage regulation. The terminal connecting resistor R1A to resistor R1B is coupled to a first input of error amplifier 112 and provides the feedback voltage signal $V_{FB}$. A second input of error amplifier 112 is coupled to a terminal providing a reference voltage $V_{REF}$. Compensation capacitor $C_{COMP}$ is coupled between $V_{OUT}$ and a compensation input of error amplifier 112.

The output of error amplifier 112 is coupled to the input of buffer amplifier 122. The output of buffer amplifier 122 is coupled to the gate of transistor 150. The source of transistor 150 is coupled to $V_{DD}$. The drain of transistor 150 is coupled to $V_{OUT}$, the output of voltage regulator 100. The load impedance 160 includes resistor $R_{LOAD}$ and capacitor $C_{LOAD}$ coupled in parallel between $V_{OUT}$ and ground.

Transistor 150 is a p-channel field effect transistor (FET). Transistor 150 is shown using a small signal model for a FET, which includes an ideal FET 152 connected in parallel with a current source 154 and a resistance 156. Current source 154 provides a current having a magnitude equal to $g_m * V_{GS}$, where $g_m$ is the transconductance of transistor 150 and $V_{GS}$ is the gate-to-source voltage of transistor 150. Resistance 156 has an impedance equal to $1/g_{ds}$ where $g_{ds}$ is the channel conductance between the source and drain of transistor 150. The term $1/g_{ds}$ is interchangeable with the output resistance, $R_0$, of transistor 150.

Resistors R1A and R1B form a voltage divider for output voltage $V_{OUT}$, providing a feedback voltage $V_{FB}$. $V_{FB}$ is compared to a reference voltage $V_{REF}$ using amplifier 112. The voltage of $V_{REF}$ is selected to be equal to the voltage of $V_{FB}$ when $V_{OUT}$ is at a specified voltage. The voltage at the output EAMPHIZ of amplifier 112 indicates whether the output voltage $V_{OUT}$ is higher or lower than the specified voltage and by what magnitude. The input of buffer amplifier 122 is coupled to the output of error amplifier 112. The output of buffer amplifier 122 is coupled to the gate of transistor 150.

If the voltage at $V_{OUT}$ is below the specified value, the output of buffer amplifier 122 will be low, increasing the gate-to-source voltage ($V_{GS}$) of transistor 150. Increasing the $V_{GS}$ of transistor 150 increases the current through resistors R1A and R1B, thereby increasing the voltage at $V_{OUT}$. If the voltage at $V_{OUT}$ is above the specified value, the $V_{GS}$ of transistor 150 will decrease. Decreasing the $V_{GS}$ of transistor 150 reduces the current through resistors R1A and R1B, thereby decreasing the voltage at $V_{OUT}$.

There are four circuit paths that provide significant contributions to the PSRR in a voltage regulator. Path 1 110 is from the voltage regulator input $V_{DD}$ through the error amplifier 112. Path 2 120 is from the voltage regulator input $V_{DD}$ through buffer amplifier 122. Path 3 130 is from the voltage regulator input $V_{DD}$ through the FET transconductance 154, which produces a current 154 of $g_m*V_{GS}$. Path 4 140 is from the voltage regulator input $V_{DD}$ through the FET impedance $1/g_{ds}$ 156, where $g_{ds}$ is the channel conductance between the source and drain of transistor 150, which varies with a change in $V_{DS}$. A change in Vis of the FET changes the amount of current flowing through transistor 150, which is modeled by path 3 130.

PSRR error contributions from path 1 110 and path 2 120 are typically minimized by the design of the voltage regulator circuit, so path 3 130 and path 4 140 are the primary PSRR error contributors. The PSRR error contribution of path 1 110 can be minimized by designing the error amplifier 112 in differential mode to minimize the AC signal from the voltage regulator input $V_{DD}$ being injected through the power supply path of error amplifier 112. The PSRR error contribution from path 2 120 can be minimized by keeping the impedance between the voltage regulator input $V_{DD}$ of buffer amplifier 122 and the gate of transistor 150 small in comparison to the impedance between the gate of transistor 150 and ground.

In path 3 130, a current equal to $g_m*V_{GS}$ is generated. Any voltage difference between the gate and source of transistor 150, $V_{GS}$, will produce a current signal flowing through transistor 150 to $V_{OUT}$. If there is any AC signal at the source of transistor 150, that signal is input supply noise. If the output of buffer amplifier 122 and the gate of transistor 150 are at ground, then $V_{GS}$ will be equal to $V_{DD}$. Any change in the frequency or amplitude of $V_{DD}$ will be transferred directly to $V_{GS}$ and produce a current 154 of $g_m*V_{GS}$ through transistor 150. In a voltage regulator, $g_m$ is typically relatively large because the FET is relatively large in size. If $g_m$ is relatively large, it will inject a relatively large current that is multiplied by the load impedance, $R_{Load}$ in parallel with $C_{Load}$. Any noise in this current signal generates a noise signal at $V_{OUT}$.

The PSRR error contribution from path 3 may be reduced by keeping the voltage at the gate of transistor 150 the same as the voltage at the source of transistor 150 so that $V_{GS}$ remains zero. This can be accomplished by AC-coupling the gate of transistor 150 to $V_{DD}$. The gate can be AC-coupled to the source of transistor 150 by keeping the impedance between the $V_{DD}$ input to buffer amplifier 122 and the gate of transistor 150 small in comparison to the impedance between the gate of transistor 150 and ground. This makes the small signal AC component of $V_{GS}$ equal to zero, so that virtually no current is injected due to an AC component of $V_{DD}$.

The PSRR error contribution from path 4 140 comes from $V_{DD}$ through the FET impedance 156 of transistor 150. Any variation in the voltage at the source of transistor 150 shows up on $V_{OUT}$. In the AC domain, $V_{OUT}$ should be at ground so that there is a voltage difference between the source and the drain of transistor 150. That voltage difference causes the FET to inject a current through the FET impedance $1/g_{ds}$ 156 into the $V_{OUT}$ signal, so the signal at $V_{OUT}$ will not be at zero in the AC domain. A voltage divider is formed with $1/g_{ds}$ 156 as the top impedance, and the bottom impedance as the series combination of R1A and R1B in parallel with $R_{Load}$ and $C_{Load}$. Having a high value for $1/g_{ds}$ 156 improves the PSRR of the circuit because most of the signal at the source of the transistor 150 will be dropped across $1/g_{ds}$, and $V_{OUT}$ will remain referenced to ground.

A portion of the noise may be compensated for in error amplifier 112 as long as the noise on $V_{DD}$ is not also on the $V_{REF}$ signal. In at least some cases, a filter capacitor is added between the $V_{REF}$ terminal and ground. Error amplifier 112 compares $V_{FB}$ to $V_{REF}$ and produces an error correction signal at its output to cause $V_{OUT}$ to follow $V_{REF}$. A feedback control loop corrects any errors between $V_{OUT}$ and $V_{REF}$ up to the AC gain capabilities of the feedback control loop. However, the feedback control loop is not typically designed to have high bandwidth due to circuit stability concerns, and the feedback control loop is often not able to keep up with a 1-20 MHz signal. At high frequencies, the gain of the feedback control loop may begin dropping and reach 0 dB at unity gain bandwidth. So, any high frequency noise injected through path 3 130 or path 4 140 may not be corrected for by error amplifier 112 due to the AC gain limitations of the feedback control loop.

Figure 2:
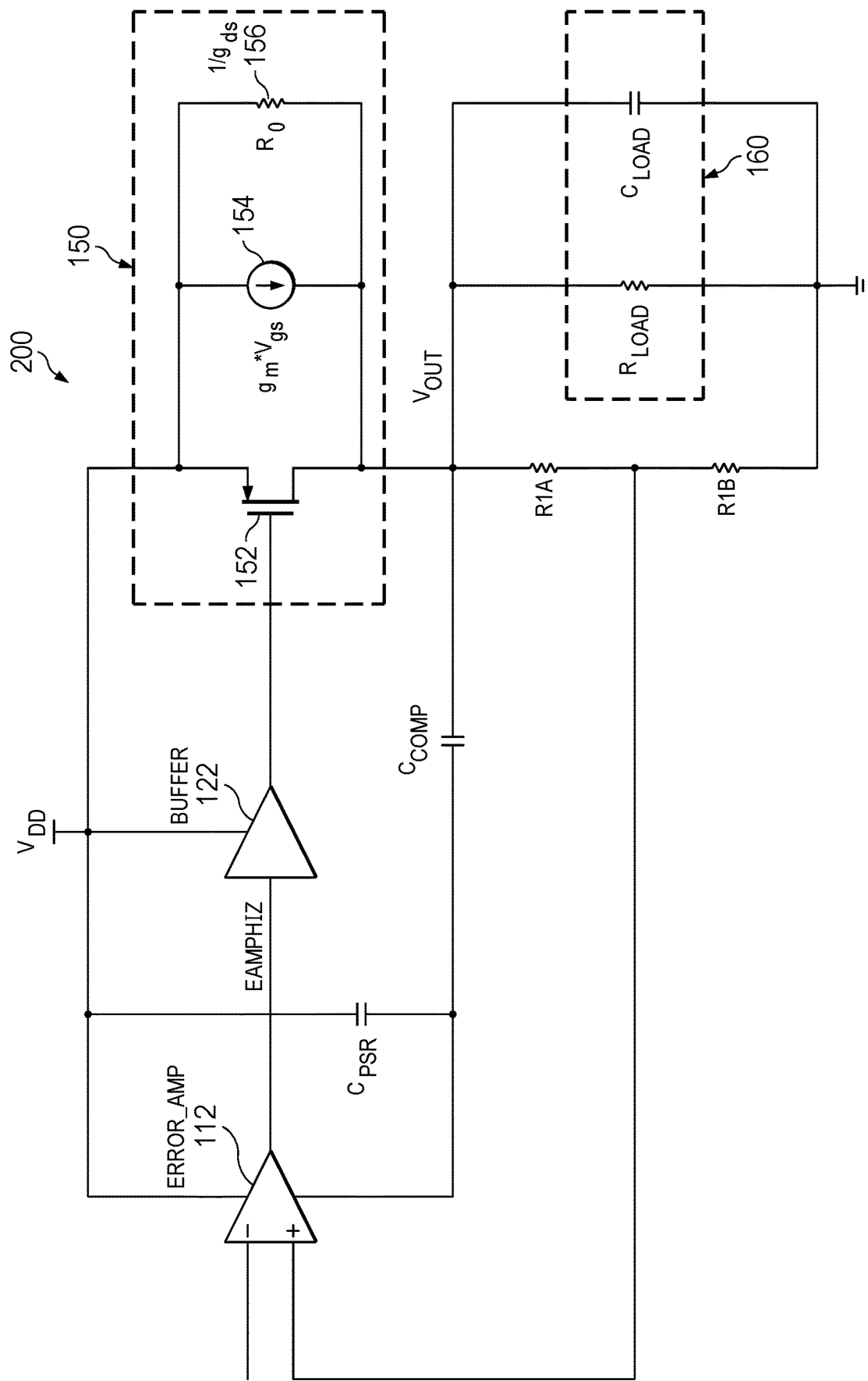
FIG. 2 shows a schematic diagram of an example voltage regulator having a feed-forward PSRR booster.

FIG. 2 shows a schematic diagram of an example voltage regulator 200 with a feed-forward PSRR booster. The PSRR booster injects current into the power supply signal $V_{DD}$ using a capacitor. At higher frequencies, the capacitor injects a feed-forward current into the error amplifier 112, which modulates the transconductance current 154 of the FET by modulating the $V_{GS}$ of the FET. The current injected by the FET impedance 156 is cancelled by a phase-reversed transconductor current of the FET.

The input for voltage regulator 200 is $V_{DD}$. The output for voltage regulator 200 is $V_{OUT}$. Resistors R1A and R1B are coupled in series between $V_{OUT}$ and ground, and form a voltage divider on the voltage at $V_{OUT}$ to provide a feedback voltage signal $V_{FB}$ for voltage regulation. The terminal connecting resistor R1A to resistor R1B is coupled to a first input of error amplifier 112 and provides the feedback voltage signal $V_{FB}$. A second input of error amplifier 112 is coupled to a voltage reference terminal providing a reference voltage $V_{REF}$. Compensation capacitor $C_{COMP}$ is coupled between $V_{OUT}$ and a compensation input of error amplifier 112.

The output of error amplifier 112 is coupled to the input of buffer amplifier 122. The output of buffer amplifier 122 is coupled to the gate of transistor 150. The source of transistor 150 is coupled to $V_{DD}$. The drain of transistor 150 is coupled to the output of voltage regulator 100, $V_{OUT}$. The load impedance 160 includes resistor $R_{LOAD}$ and capacitor $C_{LOAD}$ coupled in parallel between $V_{OUT}$ and ground.

Transistor 150 is a p-channel field effect transistor (FET). Transistor 150 is shown using a small signal model for a FET, which includes an ideal FET 152 connected in parallel with a current source 154 and a resistance 156. Current source 154 provides a current having a magnitude equal to $g_m*V_{GS}$, where $g_m$ is the transconductance of transistor 150 and $V_{GS}$ is the gate-to-source voltage of transistor 150. Resistance 156 has an impedance equal to $1/g_{ds}$ where $g_{ds}$ is the channel conductance between the source and drain of transistor 150.

Resistors R1A and R1B form a voltage divider for output voltage $V_{OUT}$, providing a feedback voltage $V_{FB}$. $V_{FB}$ is compared to a reference voltage $V_{REF}$ using amplifier 112. The voltage of $V_{REF}$ is selected to be equal to the voltage of $V_{FB}$ when $V_{OUT}$ is at a specified voltage. The output voltage EAMPHIZ of amplifier 112 indicates whether the output voltage $V_{OUT}$ is higher or lower than the specified voltage and by what magnitude. The input of buffer amplifier 122 is coupled to the output of error amplifier 112. The output of buffer amplifier 122 is coupled to the gate of transistor 150.

If the voltage at $V_{OUT}$ is below the specified value, the output of buffer amplifier 122 will be low, increasing the $V_{GS}$ of transistor 150. Increasing the $V_{GS}$ of transistor 150 increases the current through resistors R1A and R1B, thereby increasing the voltage at $V_{OUT}$. If the voltage at $V_{OUT}$ is above the specified value, the $V_{GS}$ of transistor 150 will decrease. Decreasing the $V_{GS}$ of transistor 150 reduces the current through resistors R1A and R1B, thereby decreasing the voltage at $V_{OUT}$.

Capacitor $C_{PSR}$ is coupled between $V_{DD}$ and the compensation terminal of error amplifier 112. At higher frequencies, the capacitor $C_{PSR}$ injects a feed-forward current into error amplifier 112. The current from capacitor $C_{PSR}$ modulates the transconductance current 154 of transistor 150 by modulating the $V_{GS}$ of transistor 150. The current due to the FET source to drain impedance $1/g_{ds}$ 156 will be cancelled by a phase-reversed transconductor current of transistor 150. A potential drawback to this circuit is that the capacitor injection is designed for only a limited load current and $V_{DS}$ of the FET, which can lead to overcompensation in certain conditions. Overcompensation can lead to a worse PSRR than no compensation at all in some cases.

To counteract the effects of the $1/g_{ds}$ error, current is injected from VIN to ground. The current from $g_m*V_{GS}$ is always positive, so when the load current is low or there is a large $V_{DS}$, the feed-forward current will over-compensate because the phase-reversed transconductor current will be higher than the current from the impedance of the FET. Even though the current has a phase that is opposite of the current due to $1/g_{ds}$, the current will create a worse error than the $1/g_{ds}$ error because its amplitude is higher.

Figure 3:
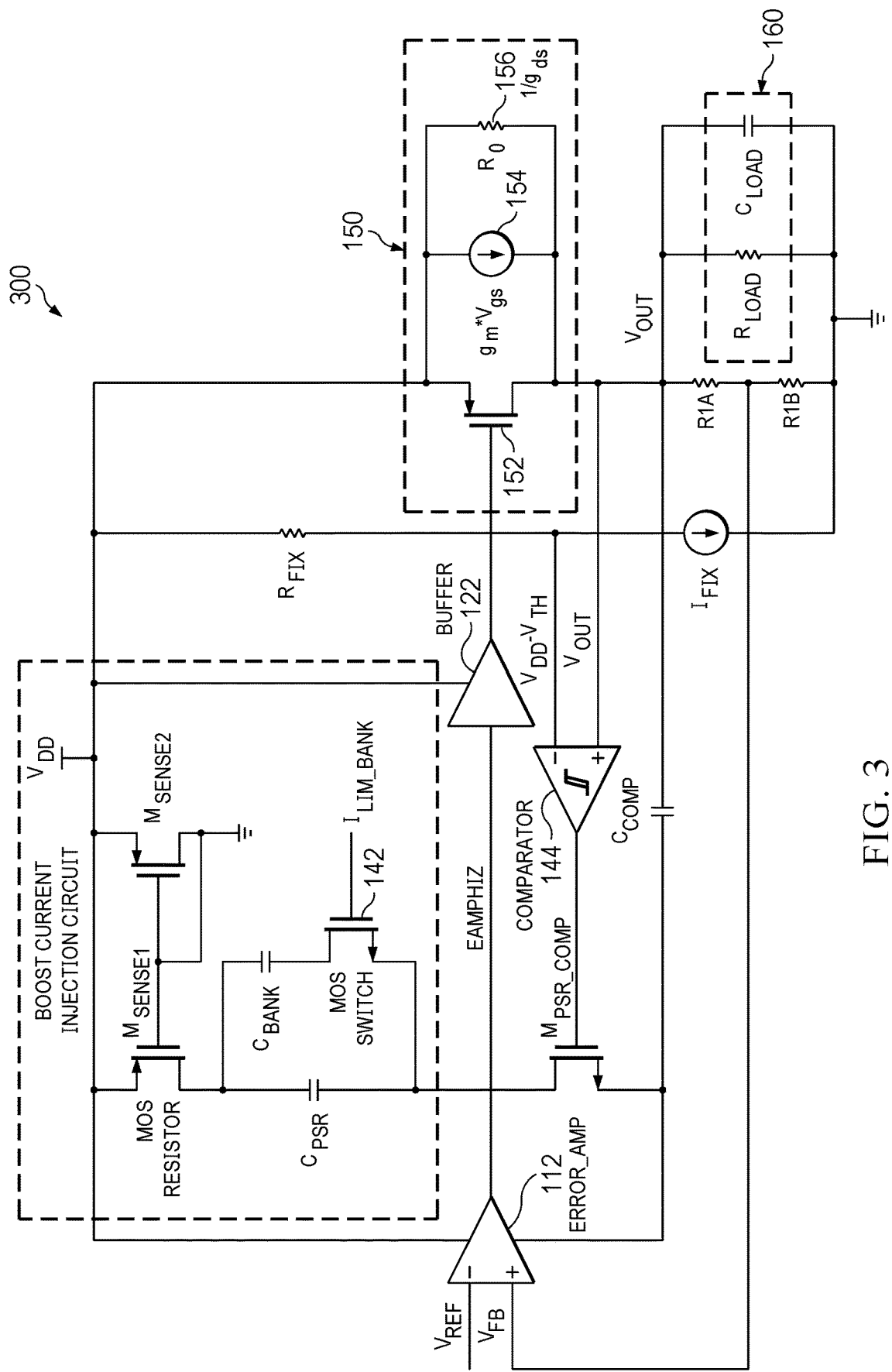
FIG. 3 shows a schematic diagram of an example voltage regulator with current injection from a capacitor bank.

FIG. 3 shows a schematic diagram of an example voltage regulator 300 with a boost current injection circuit. The input for voltage regulator 300 is $V_{DD}$. The output for voltage regulator 300 is $V_{OUT}$. Resistors R1A and R1B are coupled in series between $V_{OUT}$ and ground, and form a voltage divider on the voltage at $V_{OUT}$ to provide a feedback voltage signal $V_{FB}$ for voltage regulation. The terminal connecting resistor R1A to resistor R1B is coupled to a first input of error amplifier 112 and provides the feedback voltage signal $V_{FB}$. A second input of error amplifier 112 is coupled to a terminal providing a reference voltage $V_{REF}$. Compensation capacitor $C_{COMP}$ is coupled between $V_{OUT}$ and a compensation input of error amplifier 112.

The output of error amplifier 112 is coupled to the input of buffer amplifier 122. The output of buffer amplifier 122 is coupled to the gate of transistor 150. The source of transistor 150 is coupled to $V_{DD}$. The drain of transistor 150 is coupled to $V_{OUT}$, the output of voltage regulator 300. The load impedance 160 includes resistor $R_{LOAD}$ and capacitor $C_{LOAD}$ coupled in parallel between $V_{OUT}$ and ground.

Transistor 150 is a p-channel field effect transistor (FET). Transistor 150 is shown with its small signal model, which includes ideal FET 152 in parallel with a current source 154 and a resistance 156. Current source 154 has a current having a magnitude equal to $g_m*V_{GS}$, where $g_m$ is the transconductance of transistor 150, and $V_{GS}$ is the gate-to-source voltage of transistor 150. Resistance 156 has an impedance equal to $1/g_{ds}$ where $g_{ds}$ is the channel conductance between the source and drain of transistor 150.

Transistor $M_{SENSE1}$ has a source coupled to $V_{DD}$. A drain of transistor $M_{SENSE1}$ is coupled to first terminals of capacitor $C_{PSR}$ and adjustable capacitor bank $C_{BANK}$. Transistor $M_{SENSE2}$ is coupled between $V_{DD}$ and ground. Transistor $M_{SENSE2}$ has a gate coupled to its drain and to the gate of $M_{SENSE1}$. $M_{SENSE1}$ is a MOS resistor with a resistance controlled by the voltage across $M_{SENSE2}$. The voltage across $M_{SENSE2}$ is proportional to the load current through transistor 150. $M_{SENSE2}$ is biased by a sense current that is equal to $I_{LOAD}/N$, where $I_{LOAD}$ is the current through transistor 150, and N is the ratio of the width of transistor 150 to the width of transistor $M_{SENSE2}$.

Transistor $M_{PSR\_COMP}$ is coupled between a second terminal of capacitor $C_{PSR}$ and a compensation input of error amplifier 112. A MOS switch 142 is coupled between a second terminal of $C_{BANK}$ and $M_{PSR\_COMP}$. The MOS switch 142 may include a bank of FET switches having a control terminal coupled to a one-time-programmable (OTP) memory, or to a similar device capable of storing a current limit value. MOS switch 142 may also be controlled by a series of comparators that enable FET switches within MOS switch 142 in response to changes in load current through transistor 150. Comparator 144 has first and second inputs and an output. The first input is coupled to $V_{OUT}$, and the output is coupled to the gate of $M_{PSR\_COMP}$.

A resistor $R_{FIX}$ is coupled between $V_{DD}$ and the second input of comparator 144. A current source $I_{FIX}$ is coupled between $R_{FIX}$ and ground. Current source $I_{FIX}$ is derived from a bandgap voltage and has almost zero temperature coefficient. Current from $I_{FIX}$ passes through $R_{FIX}$ to form a near zero temperature coefficient voltage reference for comparator 144. The voltage reference is provided to the second input of comparator 144 and compared to $V_{OUT}$.

Resistors R1A and R1B form a voltage divider for output voltage $V_{OUT}$, providing a feedback voltage $V_{FB}$. $V_{FB}$ is compared to a reference voltage $V_{REF}$ using amplifier 112. The voltage of $V_{REF}$ is selected to be equal to the voltage of $V_{FB}$ when $V_{OUT}$ is at a specified voltage. The output EAM-PHIZ of amplifier 112 indicates whether the output voltage $V_{OUT}$ is higher or lower than the specified voltage and by what magnitude. The input of buffer amplifier 122 is coupled to the output of error amplifier 112. The output of buffer amplifier 122 is coupled to the gate of transistor 150.

If the voltage at $V_{OUT}$ is below the specified value, the output of buffer amplifier 122 will be low, increasing the gate-to-source voltage ($V_{GS}$) of transistor 150. Increasing the $V_{GS}$ of transistor 150 increases the current through resistors R1A and R1B, thereby increasing the voltage at $V_{OUT}$. If the voltage at $V_{OUT}$ is above the specified value, the $V_{GS}$ of transistor 150 will be decreased. Decreasing the $V_{GS}$ of transistor 150 reduces the current through resistors R1A and R1B, thereby decreasing the voltage at $V_{OUT}$.

Voltage regulator 300 uses capacitive current injection at higher frequencies. Instead of a single PSRR booster cap as in voltage regulator 200, a capacitor bank $C_{BANK}$ is coupled in parallel with PSRR booster cap $C_{PSR}$. The capacitance of capacitor bank $C_{BANK}$ can be controlled by current limit OTP bits, or may be controlled by a series of comparators that enable FET switches within MOS switch 142 in response to changes in load current through transistor 150. The value for $C_{PSR}$ is selected based on the current limit range. The variation in the FET impedance of transistor 150 with load current, and the impact that FET impedance variation has on the PSRR, is minimized by coupling a load-dependent resistance in series with the parallel combination of capacitors $C_{PSR}$ and $C_{BANK}$.

A conventional voltage regulator may have the problem of over-compensation when there is a large voltage difference between $V_{DD}$ and $V_{OUT}$, which can make the PSRR worse. In voltage regulator 300, the current from PSRR booster capacitors $C_{PSR}$ and $C_{BANK}$ is disabled when the voltage difference between $V_{DD}$ and $V_{OUT}$ crosses above a certain threshold voltage $V_{TH}$. Comparator 144 determines when the voltage difference between $V_{DD}$ and $V_{OUT}$ crosses the threshold voltage $V_{TH}$ and provides a signal at its output to stop the current flow.

The first input to comparator 144 is coupled to $V_{OUT}$. The second input to comparator 144 is coupled to $R_{FIX}$, which provides a voltage that is equal to the difference between $V_{DD}$ and the threshold voltage $V_{TH}$. The output of comparator 144 will be high if the voltage difference between $V_{DD}$ and $V_{OUT}$ is less than $V_{TH}$. The output of comparator 144 will be low if the voltage difference between $V_{DD}$ and $V_{OUT}$ is more than $V_{TH}$. If the output of comparator 144 is low, transistor $M_{PSR\_COMP}$ will be turned off, and no current will flow from $C_{PSR}$ and $C_{BANK}$. Turning off transistor $M_{PSR\_COMP}$ helps to avoid overcompensation for the PSRR error in the case where there is a large voltage difference between $V_{DD}$ and $V_{OUT}$.

Capacitor bank $C_{BANK}$ injects ripple from $V_{DD}$ into the compensation path, triggering an out-of-phase active small signal current in the FET, cancelling the current injection due to $g_{ds}$. A load dependent MOS resistance from $M_{SENSE1}$ modulates the current injection from the capacitor bank $C_{BANK}$, tracking the current due to $1/g_{ds}$ 156 of transistor 150. The capacitance of the capacitor bank $C_{BANK}$ is proportional to the voltage at $V_{DD}$, and injects a current to compensate for the current due to impedance $1/g_{ds}$ 156 so that the AC current on $V_{DD}$ has a magnitude close to zero.

Adjustments to compensate for changes due to a variation in load current can be made using the capacitor bank $C_{BANK}$ and/or the adjustment of MOS switch 142 in series with the capacitor bank. The capacitance of capacitor bank $C_{BANK}$ that is chosen corresponds to the current limit, or can be controlled by a series of comparator that enable different FET switches within MOS switch 142 in response to the load current through transistor 150. If the range of the current limit or the load current changes, the capacitance of the capacitor bank $C_{BANK}$ will also change. For example, a current of 0-500 mA may correspond to capacitance C1, a current of 500 mA to 1 A correspond to capacitance C2, and a current of 1 A to 3 A correspond to capacitance C3, where C1<C2<C3. Increasing the capacitance of capacitor bank $C_{BANK}$ increases the current through the capacitor bank. The impedance $1/g_{ds}$ 156 and the current through the capacitor bank track each other, with both increasing or decreasing linearly.

The MOS resistor $M_{SENSE1}$ is used for fine tuning the injection current within each of the current limit or load current bands. The resistance of the MOS resistor $M_{SENSE1}$ is inversely proportional to the load current, so the resistance of the MOS resistor $M_{SENSE1}$ decreases as the load current increases. As the resistance of the MOS resistor $M_{SENSE1}$ decreases, more current is injected in the circuit. So, the PSRR degradation caused by load current variation is improved by a boost current injection circuit modulating a capacitance using capacitor bank $C_{BANK}$ and fine tuning the current injection using MOS resistance $M_{SENSE1}$.

In this description, "terminal," "node," "interconnection," "lead" and "pin" are used interchangeably. Unless specifically stated to the contrary, these terms generally mean an interconnection between or a terminus of a device element, a circuit element, an integrated circuit, a device, or other electronics or semiconductor component.

In this description, "ground" includes a chassis ground, an Earth ground, a floating ground, a virtual ground, a digital ground, a common ground and/or any other form of ground connection applicable to, or suitable for, the teachings of this description.

In this description, even if operations are described in a particular order, some operations may be optional, and the operations are not necessarily required to be performed in that particular order to achieve specified results. In some examples, multitasking and parallel processing may be advantageous. Moreover, a separation of various system components in the embodiments described above does not necessarily require such separation in all embodiments.

Modifications are possible in the described embodiments, and other embodiments are possible, within the scope of the claims.

What is claimed is:

1. A circuit for reducing output voltage noise in a voltage regulator, the circuit comprising:
   an amplifier having first and second amplifier inputs, a compensation terminal, and an amplifier output, wherein the first amplifier input is coupled to a reference voltage terminal, and the compensation terminal is coupled to an output voltage terminal;
   a buffer amplifier having a buffer input and a buffer output, wherein the buffer input is coupled to the amplifier output;
   a first transistor coupled between a supply voltage terminal and the output voltage terminal, and having a first control terminal coupled to the buffer output;
   a boost current injection circuit having a boost input and a boost output, wherein the boost input is coupled to the supply voltage terminal; and
   a second transistor coupled between the boost output and the compensation terminal, and having a second control terminal;
   wherein the boost current injection circuit includes:
      a third transistor having first and second current terminals and a third control terminal, wherein the first current terminal is coupled to the supply voltage terminal, and the third control terminal is coupled to a ground terminal; and
      a fourth transistor coupled between the supply voltage terminal and the ground terminal, and having a fourth control terminal that is coupled to the ground terminal.

2. The circuit of claim 1, further comprising:
   a comparator having first and second comparator inputs and a comparator output, wherein the first comparator input is coupled to the output voltage terminal, and the comparator output is coupled to the second control terminal; and
   a resistor coupled between the supply voltage terminal and the second comparator input.

3. The circuit of claim 2, further comprising a current source coupled between the second comparator input and the ground terminal.

4. The circuit of claim 1, including a capacitor coupled between the output voltage terminal and the compensation terminal.

5. The circuit of claim 1, further comprising:
   a first resistor coupled between the output voltage terminal and the second amplifier input; and
   a second resistor coupled between the first resistor and the ground terminal.

6. The circuit of claim 1, wherein the boost current injection circuit further includes:
   a capacitor having first and second capacitor terminals, wherein the first capacitor terminal is coupled to the second current terminal; and
   a switch coupled between the capacitor and the second transistor.

7. The circuit of claim 6, wherein the switch includes a fifth transistor.

8. The circuit of claim 7, wherein the fifth transistor is an N-channel field effect transistor (NFET).

9. The circuit of claim 8, wherein the third and fourth transistors are P-channel field effect transistors (PFETs).

10. The circuit of claim 9, wherein the first transistor is a PFET, and the second transistor is an NFET.

11. The circuit of claim 6, wherein the capacitor is a capacitor bank having an adjustable capacitance.

12. The circuit of claim 11, wherein the capacitor is a first capacitor, and the boost current injection circuit includes a second capacitor coupled between the second transistor and the third transistor.

13. A voltage regulator circuit, comprising:
   an amplifier having first and second amplifier inputs, a compensation terminal, and an amplifier output, wherein the first amplifier input is coupled to a reference voltage terminal, and the compensation terminal is coupled to a first compensation circuit;
   a buffer amplifier having a buffer input and a buffer output, wherein the buffer input is coupled to the amplifier output;
   a first transistor coupled between a supply voltage terminal and an output terminal, and having a first control terminal that is coupled to the buffer output; and
   a second transistor coupled between the first compensation circuit and the output terminal, and having a second control terminal that is coupled to a second compensation circuit;
   wherein the first compensation circuit includes:
      a third transistor having first and second current terminals and a third control terminal, wherein the first current terminal is coupled to the supply voltage terminal, and the third control terminal is coupled to a ground terminal;
      a fourth transistor coupled between the supply voltage terminal and the ground terminal, and having a fourth control terminal that is coupled to the ground terminal.

14. The voltage regulator circuit of claim 13, wherein the first compensation circuit further includes:
   a capacitor having first and second capacitor terminals, wherein the first capacitor terminal is coupled to the second current terminal; and
   a switch coupled between the capacitor and the second transistor.

15. The voltage regulator circuit of claim 14, wherein the switch includes a fifth transistor.

16. The voltage regulator circuit of claim 14, wherein the capacitor is a capacitor bank having an adjustable capacitance.

17. The voltage regulator circuit of claim 16, wherein the capacitor is a first capacitor, and the first compensation circuit includes a second capacitor coupled between the second transistor and the third transistor.

18. The voltage regulator circuit of claim 13, wherein the second compensation circuit includes:
   a comparator having first and second comparator inputs and having a comparator output, wherein the first comparator input is coupled to the output terminal, and the comparator output is coupled to the second control terminal; and
   a resistor coupled between the supply voltage terminal and the second comparator input.

19. The voltage regulator circuit of claim 18, wherein the second compensation circuit includes a current source coupled between the second comparator input and the ground terminal.

20. The voltage regulator circuit of claim 13, further comprising:
   a first resistor coupled between the output terminal and the second amplifier input; and
   a second resistor coupled between the first resistor and the ground terminal.

* * * * *